US008234299B2

(12) United States Patent
Bird et al.

(10) Patent No.: US 8,234,299 B2
(45) Date of Patent: Jul. 31, 2012

(54) METHOD AND SYSTEM FOR USING FINE-GRAINED ACCESS CONTROL (FGAC) TO CONTROL ACCESS TO DATA IN A DATABASE

(75) Inventors: Paul Miller Bird, Markham (CA); Yao-Ching Stephen Chen, Saratoga (CA); George Gerald Kiernan, San Jose, CA (US); Scott Ian Logan, Don Mills (CA); Allen William Luniewski, Cupertino, CA (US); Walid Rjaibi, Markham, CA (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 12/013,253

(22) Filed: Jan. 11, 2008

(65) Prior Publication Data

US 2009/0182747 A1 Jul. 16, 2009

(51) Int. Cl.
G06F 7/00 (2006.01)
G06F 17/30 (2006.01)

(52) U.S. Cl. ...................................... 707/781
(58) Field of Classification Search .............. 707/9, 694, 707/713, 781, 999.009
See application file for complete search history.

(56) References Cited

U.S. PATENT DOCUMENTS

| | | | | |
|---|---|---|---|---|
| 5,987,455 A * | 11/1999 | Cochrane et al. | ..................... | 1/1 |
| 6,085,191 A * | 7/2000 | Fisher et al. | ................... | 707/737 |
| 6,212,511 B1 * | 4/2001 | Fisher et al. | ........................ | 1/1 |
| 6,236,996 B1 | 5/2001 | Bapat et al. | | |
| 6,487,552 B1 * | 11/2002 | Lei et al. | ............................... | 1/1 |
| 6,813,617 B2 * | 11/2004 | Wong et al. | ........................... | 1/1 |
| 7,483,896 B2 * | 1/2009 | Johnson | ................................ | 1/1 |
| 2002/0016924 A1 * | 2/2002 | Shah et al. | ..................... | 713/200 |
| 2003/0014394 A1 * | 1/2003 | Fujiwara et al. | ................... | 707/3 |
| 2003/0236781 A1 * | 12/2003 | Lei et al. | .......................... | 707/3 |
| 2004/0044655 A1 | 3/2004 | Cotner et al. | | |
| 2004/0205355 A1 | 10/2004 | Boozer et al. | | |
| 2005/0144176 A1 * | 6/2005 | Lei et al. | ........................ | 707/100 |
| 2005/0177570 A1 * | 8/2005 | Dutta et al. | ....................... | 707/9 |
| 2005/0246338 A1 * | 11/2005 | Bird | ................................ | 707/9 |
| 2005/0289342 A1 * | 12/2005 | Needham et al. | ............. | 713/169 |
| 2006/0020581 A1 * | 1/2006 | Dettinger et al. | ................. | 707/3 |
| 2006/0059567 A1 * | 3/2006 | Bird et al. | ........................ | 726/27 |
| 2008/0010233 A1 * | 1/2008 | Sack et al. | ........................ | 707/1 |
| 2008/0071785 A1 * | 3/2008 | Kabra et al. | ...................... | 707/9 |

(Continued)

OTHER PUBLICATIONS

Chaudhuri et al., Fine Grained Authorization Through Predicated Grants, Apr. 2007, IEEE Xplore, pp. 1174-1183.*

(Continued)

*Primary Examiner* — Wilson Lee
*Assistant Examiner* — Jessica N Le
(74) *Attorney, Agent, or Firm* — Sawyer Law Group, P.C.

(57) ABSTRACT

A method and system for controlling access to data stored in a table of a database are provided. The method includes marking the table of the database as being protected with fine-grained access control (FGAC), creating a system authorization class for the table of the database, the system authorization class having a default row authorization that prevents access to all rows in the table, the system authorization class being unmodifiable, creating a user authorization class for the table of the database, the user authorization class having a default row authorization that prevents access to all rows in the table, the user authorization class being modifiable, and associating the system authorization class and the user authorization class with the table of the database.

18 Claims, 2 Drawing Sheets

U.S. PATENT DOCUMENTS

| | | | |
|---|---|---|---|
| 2008/0162402 A1* | 7/2008 | Holmes et al. | 707/1 |
| 2008/0313134 A1* | 12/2008 | Lei | 707/2 |
| 2008/0319999 A1* | 12/2008 | Simpson et al. | 707/9 |

OTHER PUBLICATIONS

Leicester, J. M., "VPD and Columnar FGAC" Oramoss Oracle, http://72.14.203.104/search?q=cache: yPsSX99vWwAJ:oramossoracle.blogspot.com/+database+FGAC+%22column-level+security22&hl=en&gl=us&ct=clnk&cd=3, Jan. 8, 2006, 4 Pages.

Burleson Consulting, "Oracle Virtual Private Database Policy (VPD) Tips", http://www.dba-oracle.com/art_builder_vpd.htm, Oracle Virtual Private Database VPD with RLS and FGAC, Aug. 25, 2003, 5 Pages.

* cited by examiner

METHOD AND SYSTEM FOR USING FINE-GRAINED ACCESS CONTROL (FGAC) TO CONTROL ACCESS TO DATA IN A DATABASE

FIELD OF THE INVENTION

The present invention relates generally to data processing, and more particularly to techniques for controlling access to data in a database.

BACKGROUND OF THE INVENTION

Business enterprises typically maintain data in database. For both legal and business reasons, business enterprises are increasingly becoming sensitive to unauthorized access to data in their databases. One type database system that is commonly used by enterprise businesses is a relational database in which data is organized in rows and columns of one or more tables (or table objects). Accordingly, business enterprises are exploring and implementing a number of mechanisms to prevent inadvertent or unauthorized access to row and/or column data. In a relational database management system (RDBMS), table object privileges granted to a user control whether or not access to the data in the table object is allowed. In general, such privilege control does not conventionally extend to the column-level or the row-level.

One technique for controlling access to data in a table on a column-level or a row-level includes use of a label-based access control (LBAC) mechanism—i.e., unless a label of a user is compatible with a label associated with a row or column of a table, then the data for that row or column is not returned to the user. Business enterprises, however, have generally been less accepting of label-based access control mechanisms due to the restrictive nature of label components, the need to provide a label for rows and columns, the lack of flexibility in terms of what can be expressed within labels.

Business enterprises have turned to more flexible mechanisms—e.g., fine-grained access control (FGAC) mechanisms including views, triggers, Oracle's virtual private database, and so on. Such fine-grained access control mechanisms all have one thing in common—the mechanisms supplement, but do not supplant, access control provided by privileges. That is, if a user has a SELECT privilege on a table, the user has access to all row and column data in the table; with conventional fine-grained access control mechanisms, that access is restricted by the addition of predicates and other logic to reduce the rows (and columns) seen by the user. But, by default, every user with privileges on a table has full access to all row and column data until and unless a fine-grained access control restriction is applied to rows or columns. This leaves open the possibility that a user, with privileges on a table object, can inadvertently be missed or not affected by fine-grained access control mechanisms, and therefore the user may be able to access data that the user would otherwise not be allowed to access.

BRIEF SUMMARY OF THE INVENTION

In general, this specification describes a method, system, and computer program for method for controlling access to data stored in a table of a database. In one implementation, the method includes marking the table of the database as being protected with fine-grained access control (FGAC), creating a system authorization class for the table of the database, the system authorization class having a default row authorization that prevents access to all rows in the table, the system authorization class being unmodifiable, creating a user authorization class for the table of the database, the user authorization class having a default row authorization that prevents access to all rows in the table, the user authorization class being modifiable, and associating the system authorization class and the user authorization class with the table of the database.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The present invention relates generally to data processing, and more particularly to techniques for controlling access to data in a database system. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
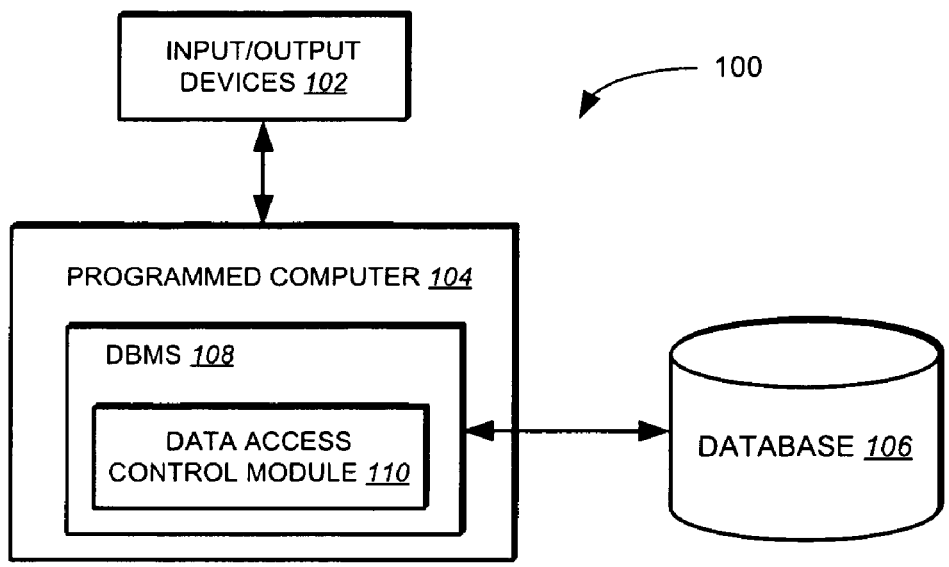
FIG. 1 is a block diagram of a data processing system including a data access control module in accordance with one implementation.

FIG. 1 illustrates a data processing system 100 in accordance with one implementation. Data processing system 100 includes input and output devices 102, a programmed computer 104, and a database 106. Input and output devices 102 can include devices such as a printer, a keyboard, a mouse, a digitizing pen, a display, a printer, and the like. Programmed computer 104 can be any type of computer system, including for example, a workstation, a desktop computer, a laptop computer, a personal digital assistant (PDA), a cell phone, a network, and so on. Database 106 can be a relational database including one or more tables (not shown) for storing data.

Running on programmed computer 104 is a database management system (DBMS) 108 including a data access control module 110. In one implementation, the database management system (DBMS) 108 and data access control module 110 are features of DB2 available from International Business Machines, Corporation of Armonk, N.Y. In one implementation, the data access control module 110 implements a fine-grained access control (FGAC) to control user access to data stored in one or more tables of the database 106. The FGAC can be used to deny access to particular row(s) or column(s) of the one or more tables in the database 106, which will be discussed in greater detail below.

In one implementation, the data access control module 110 implements row authorization and column authorization as the FGAC on the one or more tables in database 106. In addition to the row/column authorization, there may also be traditional object-level (or table-level) privileges on each table (e.g., SELECT privilege on a table EMPLOYEE). In one implementation, a row authorization allows the holder of such authorization access to a subset of rows of an FGAC protected table. In one implementation, a column authorization allows the holder of such authorization access to a subset of values (or cells) in a column of an FGAC protected table. In one implementation, row authorizations take precedence over column authorizations—i.e., if a user is not authorized to see any rows in an FGAC protected table, a column authorization for some column in that table will not allow that user to see any values in that column.

In one implementation, row and column authorizations are associated with a higher level entity called an authorization class. An authorization class (in one implementation) is associated with one and only one FGAC protected table, and contains one or more row authorizations and zero or more column authorizations. When an authorization class is created, a default row authorization that denies all access (e.g., a row predicate of "1=0") is created and implicitly granted to PUBLIC. This default row authorization cannot be deleted from the class nor can the default row authorization be revoked as it represents the default access available to users (which is none) through this authorization class.

Figure 2:
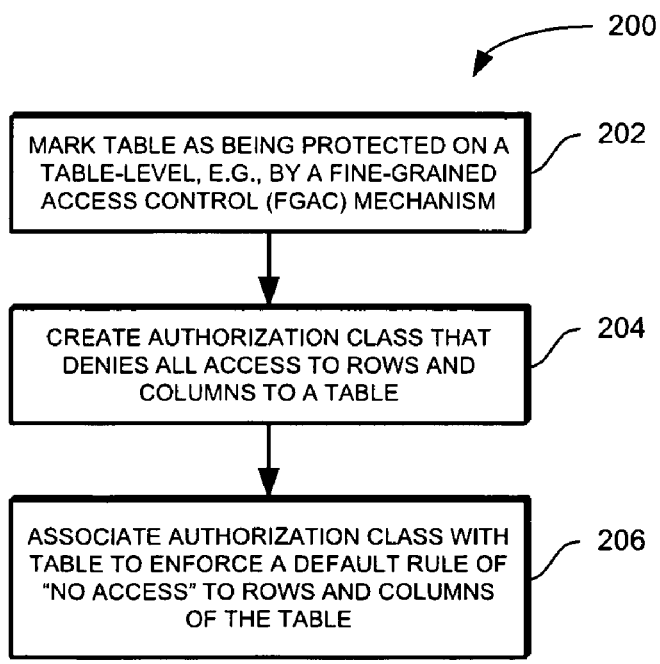
FIG. 2 illustrates one implementation of a method for controlling access to data in a table of a database.

FIG. 2 illustrates a method 200 for controlling access to data in a table of a database in accordance with one implementation. A table (e.g., in database 106) is marked as being protected on a table-level (step 202). For example, the table can be marked as being protected on a table-level by a database management system assigning one or access privileges to the table—i.e., access to the table is defined to the table as a whole. In one implementation, a fine-grained access control mechanism is applied to the table to protect (or control access to) the table on a table-level. Other suitable techniques for protecting access to a table on a table-level (or object-level) can be implemented. An authorization class is created (e.g., by the database management system) that, as a default, prevents access to all rows and columns of a table (step 204). In one implementation, a default system authorization class is created as well as a default user authorization class. Both of these classes contain the normal class default row authorization described above. The system authorization class enforces the default access rule of "no access" for an FGAC protected table and this class cannot be dropped or modified in any way. The default user authorization class is provided as a location for any authorizations for which no authorization class is specified (i.e. it is a convenience to allow for authorizations to be defined without creating an authorization class); while the default user authorization class cannot be dropped, it can be modified like any other user defined authorization class.

An authorization class can be granted to (or revoked from) users, roles, groups, or PUBLIC. Granting an authorization class implicitly includes all authorizations defined within that class. If subsequent changes are made to the contents of that authorization class, those changes are automatically inherited by anyone granted the authorization class. If desired, row authorizations and column authorizations from an authorization class can be individually granted (with the exception of the class default row authorization); this would be of value in those cases where one or more of the authorizations, but not all, within an authorization class are to be granted or where there is no desire to have future changes to the contents of the authorization class automatically inherited.

The authorization class (or classes) is associated with the table to enforce a default rule of "no access" to rows and columns of the table (step 206). All authorization classes defined on the same table affect and are considered for each and every query against that table. When more than one authorization of the same type (e.g., row or column) from the same authorization class apply to the same user, these authorizations are logically OR'ed together allowing that user access to the union of data authorized through those authorizations. For example, if user Joe is authorized to see all blue rows according to one row authorization in class AC1, and is authorized to see all red rows according to another authorization from the same authorization class AC1, then user Joe is allowed access to the union of blue and red rows.

By default, (in one implementation) the contents of different authorization classes on the same table are logically OR'ed together to achieve a union. However, sometimes this is not the desired behavior—i.e., in some cases, the contents of one or more of the authorization classes are considered to refine the contents of other authorization classes and the desire is to have the intersection of these authorization classes be used rather than the union. In such cases, the relationship between two authorization classes can be explicitly defined to be an intersect and the aggregate of authorizations present in the query from each authorization class will be logically AND'ed together instead. Specifically, when two classes are defined as intersecting, authorizations from the same authorization class will be OR'ed together to form a set and then logically AND'ed with the set from the other authorization class. For example, if user Joe is authorized to see all blue rows according to a row authorization in one authorization class AC1, and is authorized to see all rows for Canadian residents according to another authorization from a different authorization class AC2, where authorization class AC2 has been defined as intersecting with authorization class AC1, then user Joe is authorized to see a view that contains the blue rows representing Canadian residents only (not all the blue rows). An authorization class can be defined to intersect with one or more (or all) authorization classes on the same FGAC protected table.

EXAMPLE

The following example illustrates one implementation of the techniques discussed above. Assume the following environment:
    CREATE TABLE MYSCHEMA.T1 (C1 INT, C2 INT WITH ALTERNATE VALUE 99, C3 INT) PROTECTED BY FGAC
    CREATE ROLE WAREHOUSE
    CREATE ROLE ACCOUNTING
    CREATE ROLE TEMPORARY_ACCOUNTING
    GRANT SELECT ON MYSCHEMA.T1 TO ROLE WAREHOUSE, ROLE ACCOUNTING, ROLE TEMPORARY_ACCOUNTING
    GRANT ROLE WAREHOUSE TO FERNANDO
    GRANT ROLE ACCOUNTING TO BOB
    GRANT ROLE TEMPORARY_ACCOUNTING TO HALEY
The introduction of FGAC protection causes two authorization classes to be created:
    the system authorization class SYSIBM_DEFAULT containing the row authorization ROWDEFAULT with the (1=0) predicate which is implicitly granted to PUBLIC
    the default user authorization class USER_DEFAULT containing the row authorization ROWDEFAULT with the (1=0) predicate which is implicitly granted to PUBLIC
Bob, Fernando, and Haley all have SELECT privilege on MYSCHEMA.T1 from their role membership, but they do not have access to any rows in that table. If any of them issues a SELECT * FROM MYSCHEMA.T1, the internal representation of the query within the SQL compiler is the equivalent of:
    SELECT * FROM (SELECT C1, 99, C3 FROM MYSCHEMA.T1 WHERE (1=0) OR (1=0))

Observe that there are two "1=0" predicates injected in SELECT query statement. The first predicate represents the default row authorization contained by the default user authorization class that was created when the table was marked as FGAC protected; the second predicate represents the default row authorization from the system defined authorization class. Since there are no column authorizations granted to any of them, DB2 injects just the alternate value for column C2 in the column. (NOTE: the SQL compiler is smart enough to remove the redundant 1=0 predicates above but leaving them in makes the description easier to follow).

Let us assume that the job definition for the members of the ACCOUNTING role requires them to see all rows where the column C1 equals 5. To allow this, a row authorization needs to be created and granted to the role. The security administrator decides to create an authorization class to represent the access needed for the ACCOUNTING job definition, creates a row authorization within the authorization class, and grants the set as a whole to the ACCOUNTING role.

CREATE AUTHORIZATION CLASS ACCOUNTING ON MYSCHEMA.T1
    CREATE AUTHORIZATION ROWAUTH1 WITHIN MYSCHEMA.T1 ACCOUNTING
        FOR ROWS WHERE C1=5
    GRANT AUTHORIZATION CLASS MYSCHEMA.T1.ACCOUNTING TO ROLE ACCOUNTING

Now, if Bob issues a SELECT * FROM MYSCHEMA.T1, he will be able to access some rows in this table based on the following reasons. First, Bob has SELECT privilege on MYSCHEMA.T1 granted to him via the role ACCOUNTING. Second, this same role has been granted an authorization class, ACCOUNTING, defined on table MYSCHEMA.T1. The ACCOUNTING class contains a row authorization which allows Bob to see all rows in MYSCHEMA.T1 where column C1=5. However, Bob does not hold (directly or indirectly) a column authorization for protected column C2. Therefore, Bob will still see the alternate value 99 for all rows in MYSCHEMA.T1 where column C1=5. The internal representation of the query within the SQL compiler is the equivalent of:

SELECT * FROM (SELECT C1, 99, C3 FROM MYSCHEMA.T1
        WHERE ((C1=5) OR (1=0)) OR (1=0) OR (1=0))

The first row predicate of ((C1=5) OR (1=0)) represents the authorizations granted to Bob indirectly when the authorization class ACCOUNTING was granted to the role ACCOUNTING. The first row predicate represents all the current authorizations in this authorization class. The next row predicate (1=0) is the default row authorization from the default user authorization class. The last row predicate (1=0) is the default row authorization from the system defined authorization class. Since no class intersects with any other, the predicates are OR'ed together to get the union.

To allow Bob access to values in column C2, a column authorization must be defined and granted to him, or to a role he is member in, or to a group he is member in, or to PUBLIC. Let's assume that the ACCOUNTING job definition requires access to column C2 so the security administrator defines a new column authorization in the existing ACCOUNTING authorization class which contains a condition allowing access only to a set of specific values in column C2.

CREATE AUTHORIZATION COLUMNAUTH1 WITHIN ACCOUNTING
        FOR COLUMN C2 WHERE C2>10

Now, if Bob issues a SELECT * FROM MYSCHEMA.T1, the internal representation of the query within the SQL compiler is the equivalent of:

SELECT * FROM (SELECT C1, (CASE WHEN C2>10 THEN C2 ELSE 99 END), C3 FROM MYSCHEMA.T1
        WHERE ((C1=5) OR (1=0)) OR (1=0) OR (1=0))

The row predicates are as they were in the previous case but now Bob has automatically inherited the new column authorization in the ACCOUNTING authorization class as well.

Meanwhile, Haley is still unable to access any rows in the table. As a temporary employee in accounting, let us assume that she is only allowed to see the same rows as Bob but not the contents of column C2. The security administrator could define an authorization class to represent this particular case, but instead the security administrator chooses to simply grant the ROWAUTH1 authorization, but not the ACCOUNTING authorization class itself, directly to the role TEMPORARY_ACCOUNTING since the security administrator plans to later remove it (i.e., it is a temporary solution:)

GRANT AUTHORIZATION ROWAUTH1 WITHIN MYSCHEMA.T1.ACCOUNTING TO ROLE TEMPORARY_ACCOUNTING

Now, if Haley issues a SELECT * FROM MYSCHEMA.T1, the internal representation of the query within the SQL compiler is the equivalent of:

SELECT * FROM (SELECT C1, 99, C3 FROM MYSCHEMA.T1
        WHERE ((C1=5) OR (1=0)) OR (1=0) OR (1=0))

Since Haley does not have column authorization for column C2, she will simply get the alternate value. Also, since she was granted a specific authorization and not the authorization class, she will not automatically inherit the rest of the authorizations, or any future changes, that exist in the class.

Suppose that the security administrator wishes to stop all access as he tracks a security problem. To do so, the security administrator quickly alters the default user authorization class, which currently only has the default row authorization, to intersect with all other authorization classes on the table as follows:

ALTER AUTHORIZATION CLASS USER_DEFAULT ON MYSCHEMA.T1 INTERSECTS WITH ALL

At this point, if Bob or Haley issues a SELECT * FROM MYSCHEMA.T1, they will see no rows at all for the following reason. The change to make the USER_DEFAULT authorization class intersect with all other authorization classes now means that the granted authorizations from USER_DEFAULT, in this case the default row authorization for the class, are logically AND'ed with all the others. The internal representation of the query within the SQL compiler is the equivalent of:

SELECT * FROM (SELECT C1, (CASE WHEN C2>10 THEN C2 ELSE 99 END), C3 FROM MYSCHEMA.T1
        WHERE ((1=0) AND (((C1=5) OR (1=0)) OR (1=0)))

In this case, the relevant authorizations from the intersecting authorization class have been placed in the first predicate and then logically AND'ed with the union of the relevant authorizations from all the other classes. Obviously, Bob sees no rows this way. To remove the emergency access stoppage, the security administrator modifies the USER_DEFAULT authorization class so that is not longer intersecting with all others. Accordingly, authorization classes can dynamically adjust to change (e.g., changes to class are automatically seen by all who have access to class).

Fernando can still not see any rows as nothing has changed for him. As a member of the Warehouse team, it is decided that Fernando is allowed to see any rows where column C3<100. The security administrator decides not to create a new authorization class for this case and does the following:
    CREATE AUTHORIZATION ROWAUTH2
        FOR ROWS WHERE (C3<100)
This causes a row authorization to be created in the USER_DEFAULT authorization class. The security administrator now grants this to the Warehouse role so that Fernando acquires the row authorization, as follows:
    GRANT AUTHORIZATION ROWAUTH2 WITHIN MYSCHEMA.T1.USER_DEFAULT TO ROLE WAREHOUSE
Now, if Fernando issues a SELECT * FROM MYSCHEMA.T1, the internal representation of the query within the SQL compiler is the equivalent of:
    SELECT * FROM (SELECT C1, 99, C3 FROM MYSCHEMA.T1
        WHERE ((1=0)) OR ((C3<100) OR (1=0)) OR (1=0))
Since Fernando does not have column authorization for column C2, he will simply get the alternate value. The first row predicate (1=0) is the default row predicate from the ACCOUNTING authorization class while the second row predicate ((C3<100) OR (1=0)) shows the union of all authorizations available to Fernando in the USER_DEFAULT authorization class. The last row predicate is the default row predicate from the system defined authorization class.

Suppose that the security administrator wishes to limit the rows that can be seen on the weekend by anyone in accounting to those for which column C3 is equal to zero. To do so, the security administrator creates a new authorization class WEEKEND_ACCESS that intersects with authorization class ACCOUNTING as follows:
    CREATE AUTHORIZATION CLASS WEEKEND_ACCESS ON MYSCHEMA.T1 Intersects with Accounting
    CREATE AUTHORIZATION ROWAUTH3 WITHIN WEEKEND_ACCESS
        FOR ROWS WHERE (IS_WEEKEND( ) AND C3=0)
    GRANT AUTHORIZATION CLASS MYSCHEMA.T1 WEEKEND_ACCESS TO PUBLIC
Now, if Bob issues a SELECT * FROM MYSCHEMA.T1, the internal representation of the query within the SQL compiler is the equivalent of:
    SELECT * FROM (SELECT C1, (CASE WHEN C2>10 THEN C2 ELSE 99 END), C3 FROM MYSCHEMA.T1
        WHERE (((IS_WEEKEND( ) AND C3=0) OR (1=0))
            AND ((C1=5) OR (1=0))) OR (1=0) OR (1=0)))
In this case, the predicate ((IS_WEEKEND( ) AND C3=0) OR (1=0)) represents all the relevant authorizations from the new authorization class WEEKEND_ACCESS and these are logically AND'ed with all the relevant authorizations from the intersecting authorization class ACCOUNTING in the form of the predicate ((C1=5) OR (1=0)). Finally, the relevant authorizations from the other, non-intersecting authorization classes are OR'ed in (for this example, they are simply the class default authorizations for the system and user default classes).

Note that this new intersecting class also affects Haley but not Fernando. If Haley issues a SELECT * FROM MYSCHEMA.T1, the internal representation of the query within the SQL compiler is the equivalent of:
    SELECT * FROM (SELECT C1, 99, C3 FROM MYSCHEMA.T1
        WHERE (((IS_WEEKEND( ) AND C3=0) OR (1=0))
            AND ((C1=5) OR (1=0))) OR (1=0) OR (1=0)))
Since Haley's access is dependent on the authorizations in the ACCOUNTING class, the new authorization WEEKEND_ACCESS class can close off that access since its authorizations are AND'ed with those in the ACCOUNTING class. If Fernando issues a SELECT * FROM MYSCHEMA.T1, the internal representation of the query within the SQL compiler is the equivalent of:
    SELECT * FROM (SELECT C1, 99, C3 FROM MYSCHEMA.T1
        WHERE (((IS_WEEKEND( ) AND C3=0) OR (1=0))
            AND ((1=0))) OR ((C3<100) OR (1=0)) OR (1=0)))
In this case, Fernando is not dependent on authorizations from ACCOUNTING and so his access is not affected by the new authorization class.

In the example above, rather than modify the column definition to implement FGAC, an administrator can simply create a column authorization as follows:
    CREATE AUTHORIZATION AUTHx
    ON TABLE T1
    FOR COLUMN C2
    (Case when C2>10 then C2 Else 99 End)
Hence, the alternate value need not be specified together with the table definition and could be done separately within the column authorization definition.

Implementation

In one implementation, SQL DDL statements are used to create authorization classes and authorizations as well as to grant and revoke the authorization classes. Modified SQL statements can be used to modify table attributes to activate FGAC protection. When an SQL/XML statement is compiled, for each reference to a table marked as FGAC protected, the authorization classes defined for that table, be it the one created explicitly by the administrator or the default one created by the system when the table is marked protected, are searched and any relevant row or column authorizations in that class for the statement authorization information (primary and secondary authorization IDs) are gathered; relevancy is determined by whether the authorization class, or individual authorization, has been granted to one of the authorization IDs in the statement authorization information.

A "pseudo-view" definition is created by: gathering all the relevant row authorizations from the same authorization class and logically OR'ing them together in a "authorization class expression"; identifying which authorization classes, if any, are defined as intersecting with each other and logically AND'ing the "authorization class expression" for each of these classes with the other to create a "intersecting authorization class expression" set; logically OR'ing any remaining "authorization class expression" with each other and then logically OR'ing them with all "intersecting authorization class expression" sets; using the final result as the predicate portion of the "pseudo-view" definition. Similar logic is followed for dealing with the expressions from all relevant column authorizations with the end result for each unique column being implemented as CASE logic in the appropriate location for the column in select list of the "pseudo-view" definition. If no column authorizations are found, then the defined alternate value is implemented as a constant in that location.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 3:
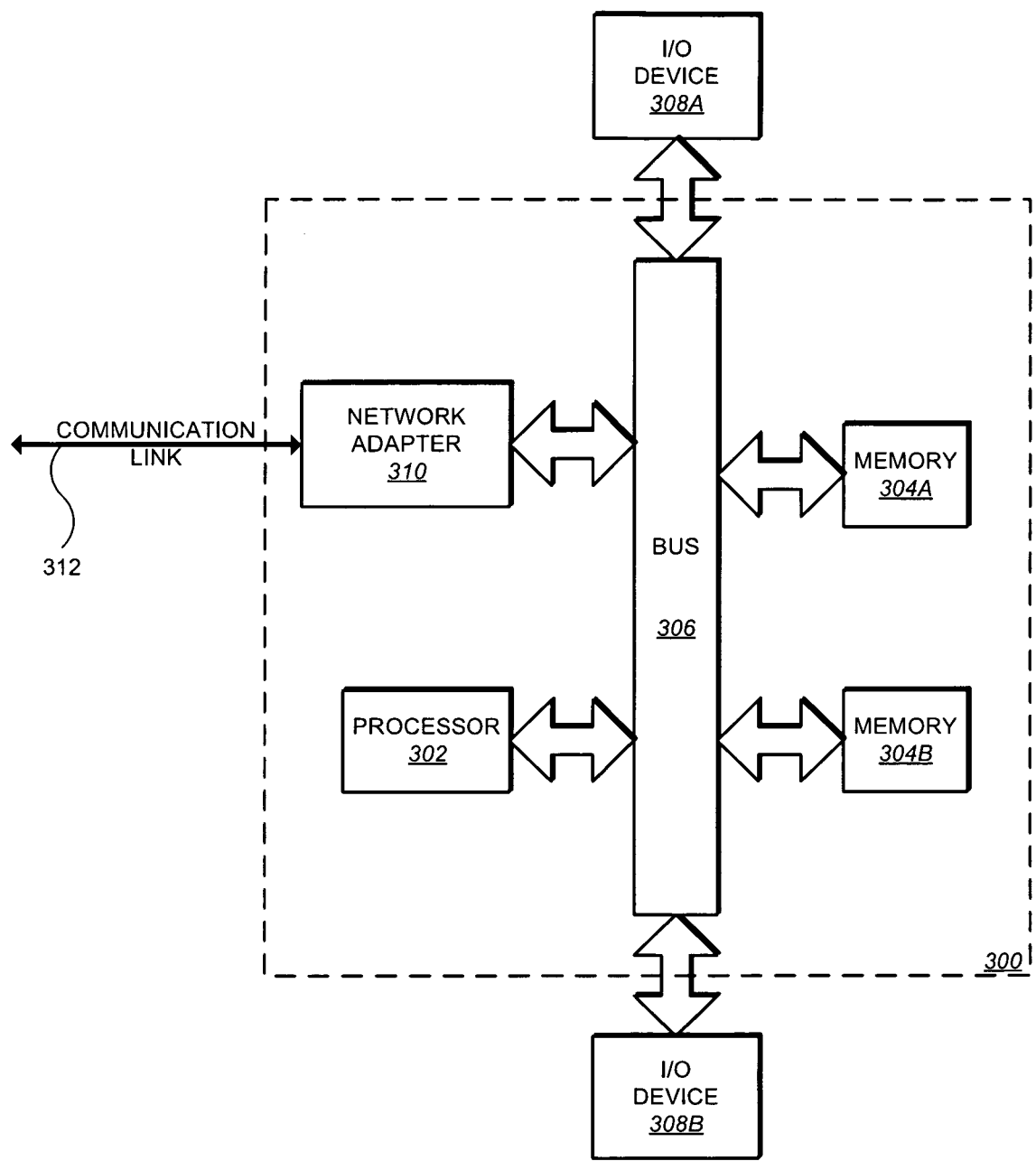
FIG. 3 is a block diagram of a data processing system suitable for assisting a user in creating software code in accordance with one implementation.

FIG. 3 illustrates a data processing system 300 suitable for storing and/or executing program code. Data processing system 300 includes a processor 302 coupled to memory elements 304A-B through a system bus 306. In other implementations, data processing system 300 may include more than one processor and each processor may be coupled directly or indirectly to one or more memory elements through a system bus. Memory elements 304A-B can include local memory employed during actual execution of the program code, bulk storage, and cache memories that provide temporary storage of at least some program code in order to reduce the number of times the code must be retrieved from bulk storage during execution. As shown, input/output or I/O devices 308A-B (including, but not limited to, keyboards, displays, pointing devices, etc.) are coupled to data processing system 300. I/O devices 308A-B may be coupled to data processing system 300 directly or indirectly through intervening I/O controllers (not shown).

In one implementation, a network adapter 310 is coupled to data processing system 300 to enable data processing system 300 to become coupled to other data processing systems or remote printers or storage devices through communication link 312. Communication link 312 can be a private or public network. Modems, cable modems, and Ethernet cards are just a few of the currently available types of network adapters.

Various implementations for controlling access to data in a database have been described. Nevertheless, various modifications may be made to the implementations. For example, steps of the methods described above can be performed in a different order and still achieve desirable results. Accordingly, many modifications may be made without departing from the scope of the following claims.

What is claimed is:

1. A computer-implemented method for controlling access to data stored in a table of a database, wherein the computer performs the functions in the following method, the method comprising:
   marking the table of the database as being protected with fine-grained access control (FGAC);
   creating a system authorization class for the table of the database, the system authorization class having a default row-level authorization that prevents access to all rows in the table, the system authorization class being unmodifiable;
   creating a user authorization class for the table of the database, the user authorization class having a default row-level authorization that prevents access to all rows in the table, the user authorization class being modifiable wherein the user authorization class is provided as a location for any authorizations for which no authorization class is specified;
   associating the system authorization class and the user authorization class with the table of the database, wherein the association of the system authorization class with the table of the database operates to deny access to the rows and columns of the table;
   receiving a request from a user seeking to access data in the table of the database;
   determining whether any other user authorization class is applicable to the user;
   responsive to no other user authorization class being applicable to the user,
      determining whether the system authorization class and the user authorization class are defined as intersecting classes;
      responsive to the system authorization class and the user authorization class being defined as intersecting classes, preventing the user from accessing any row in the table of the database;
      responsive to the system authorization class and the user authorization class not being defined as intersecting classes, permitting the user to access rows or columns in the table of the database based on the union of authorizations.

2. The computer-implemented method of claim 1 further comprising:
   responsive to the system authorization class and the user authorization class not being defined as intersecting classes,
      forming a union of authorizations by logically OR'ing authorizations from the system authorization class and the user authorization class.

3. The computer-implemented method of claim 2, wherein responsive to at least one other user authorization class being applicable to the user, the method further comprises:
   determining whether the system authorization class and the at least one other user authorization class are defined as intersecting classes; and
   responsive to the system authorization class and the at least one other user authorization class being defined as intersecting classes, preventing the user from accessing any row in the table of the database.

4. The computer-implemented method of claim 3, wherein responsive to the system authorization class and the at least one other user authorization class not being defined as intersecting classes, the method further comprises:
   determining whether the user authorization class and the at least one other user authorization class are defined as intersecting classes;
   responsive to the user authorization class and the at least one other user authorization class being defined as intersecting classes,
      forming a first set of authorizations by logically OR'ing authorizations from the user authorization class;
      forming a second set of authorizations by logically OR'ing authorizations from the at least one other user authorization class;
      forming an intersection of authorizations by logically AND'ing the first set of authorizations and the second set of authorizations; and
      permitting the user to access rows or columns in the table of the database based on the intersection of authorizations.

5. The computer-implemented method of claim 4, wherein responsive to the user authorization class and the at least one other user authorization class not being defined as intersecting classes, the method further comprises:
forming a union of authorizations by logically OR'ing authorizations from the user authorization class and the at least one other user authorization class; and
permitting the user to access rows or columns in the table of the database based on the union of authorizations.

6. The computer-implemented method of claim 1, wherein the database is a relational database.

7. A non-transitory computer program product comprising a non-transitory computer readable storage medium, the non-transitory computer readable storage medium for controlling access to data stored in a table of a database, the computer program comprising computer executable code for:
marking the table of the database as being protected with fine-grained access control (FGAC);
creating a system authorization class for the table of the database, the system authorization class having a default row-level authorization that prevents access to all rows in the table, the system authorization class being unmodifiable wherein the user authorization class is provided as a location for any authorizations for which no authorization class is specified;
creating a user authorization class for the table of the database, the user authorization class having a default row-level authorization that prevents access to all rows in the table, the user authorization class being modifiable; and
associating the system authorization class and the user authorization class with the table of the database, wherein the association of the system authorization class with the table of the database operates to deny access to the rows and columns of the table;
receiving a request from a user seeking to access data in the table of the database;
determining whether any other user authorization class is applicable to the user;
responsive to no other user authorization class being applicable to the user,
determining whether the system authorization class and the user authorization class are defined as intersecting classes;
responsive to the system authorization class and the user authorization class being defined as intersecting classes, preventing the user from accessing any row in the table of the database;
responsive to the system authorization class and the user authorization class not being defined as intersecting classes, permitting the user to access rows or columns in the table of the database based on the union of authorizations.

8. The non-transitory computer product of claim 7, wherein the computer program product further comprises computer executable code for:
responsive to the system authorization class and the user authorization class not being defined as intersecting classes,
forming a union of authorizations by logically OR'ing authorizations from the system authorization class and the user authorization class.

9. The non-transitory computer program product of claim 8, wherein responsive to at least one other user authorization class being applicable to the user, the computer program product further comprises computer executable code for:
determining whether the system authorization class and the at least one other user authorization class are defined as intersecting classes; and
responsive to the system authorization class and the at least one other user authorization class being defined as intersecting classes, preventing the user from accessing any row in the table of the database.

10. The non-transitory computer program product of claim 9, wherein responsive to the system authorization class and the at least one other user authorization class not being defined as intersecting classes, the computer program product further comprises computer executable code for:
determining whether the user authorization class and the at least one other user authorization class are defined as intersecting classes;
responsive to the user authorization class and the at least one other user authorization class being defined as intersecting classes,
forming a first set of authorizations by logically OR'ing authorizations from the user authorization class;
forming a second set of authorizations by logically OR'ing authorizations from the at least one other user authorization class;
forming an intersection of authorizations by logically AND'ing the first set of authorizations and the second set of authorizations; and
permitting the user to access rows or columns in the table of the database based on the intersection of authorizations.

11. The non-transitory computer program product of claim 10, wherein responsive to the user authorization class and the at least one other user authorization class not being defined as intersecting classes, the computer program product further comprises computer executable code for:
forming a union of authorizations by logically OR'ing authorizations from the user authorization class and the at least one other user authorization class; and
permitting the user to access rows or columns in the table of the database based on the union of authorizations.

12. The non-transitory computer program product of claim 7, wherein the database is a relational database.

13. A non-transitory computer system comprising:
a processing system;
a storage medium;
a database; and
a database management system controlling access to data stored in a table of the database, the database management system
marking the table of the database as being protected with fine-grained access control (FGAC);
creating a system authorization class for the table of the database, the system authorization class having a default row-level authorization that prevents access to all rows in the table, the system authorization class being unmodifiable;
creating a user authorization class for the table of the database, the user authorization class having a default row-level authorization that prevents access to all rows in the table, the user authorization class being modifiable wherein the user authorization class is provided as a location for any authorizations for which no authorization class is specified;
associating the system authorization class and the user authorization class with the table of the database, wherein the association of the system authorization class with the table of the database operates to deny access to the rows and columns of the table;
receiving a request from a user seeking to access data in the table of the database;

determining whether any other user authorization class is applicable to the user;

responsive to no other user authorization class being applicable to the user, determining whether the system authorization class and the user authorization class are defined as intersecting classes;

responsive to the system authorization class and the user authorization class being defined as intersecting classes, preventing the user from accessing any row in the table of the database;

responsive to the system authorization class and the user authorization class not being defined as intersecting classes, permitting the user to access rows or columns in the table of the database based on the union of authorizations.

14. The non-transitory computer system of claim 13, wherein the database management system further responsive to the system authorization class and the user authorization class not being defined as intersecting classes, forms a union of authorizations by logically OR'ing authorizations from the system authorization class and the user authorization class.

15. The non-transitory computer system of claim 14, wherein responsive to at least one other user authorization class being applicable to the user, the database management system further determines whether the system authorization class and the at least one other user authorization class are defined as intersecting classes, and responsive to the system authorization class and the at least one other user authorization class being defined as intersecting classes, prevents the user from accessing any row in the table of the database.

16. The non-transitory computer system of claim 15, wherein responsive to the system authorization class and the at least one other user authorization class not being defined as intersecting classes, the database management system further determines whether the user authorization class and the at least one other user authorization class are defined as intersecting classes, responsive to the user authorization class and the at least one other user authorization class being defined as intersecting classes, forms a first set of authorizations by logically OR'ing authorizations from the user authorization class, forms a second set of authorizations by logically OR'ing authorizations from the at least one other user authorization class, forms an intersection of authorizations by logically AND'ing the first set of authorizations and the second set of authorizations, and permits the user to access rows or columns in the table of the database based on the intersection of authorizations.

17. The non-transitory computer system of claim 16, wherein responsive to the user authorization class and the at least one other user authorization class not being defined as intersecting classes, the database management system further forms a union of authorizations by logically OR'ing authorizations from the user authorization class and the at least one other user authorization class, and permits the user to access rows or columns in the table of the database based on the union of authorizations.

18. The non-transitory computer system of claim 13, wherein the database is a relational database.

* * * * *